March 14, 1933.    R. C. NEWHOUSE    1,901,766
PACKING
Filed July 7, 1930
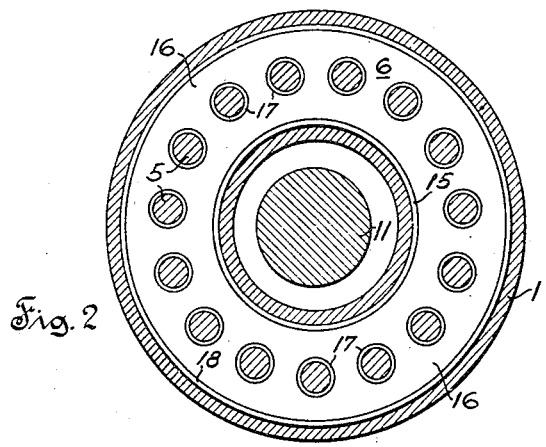
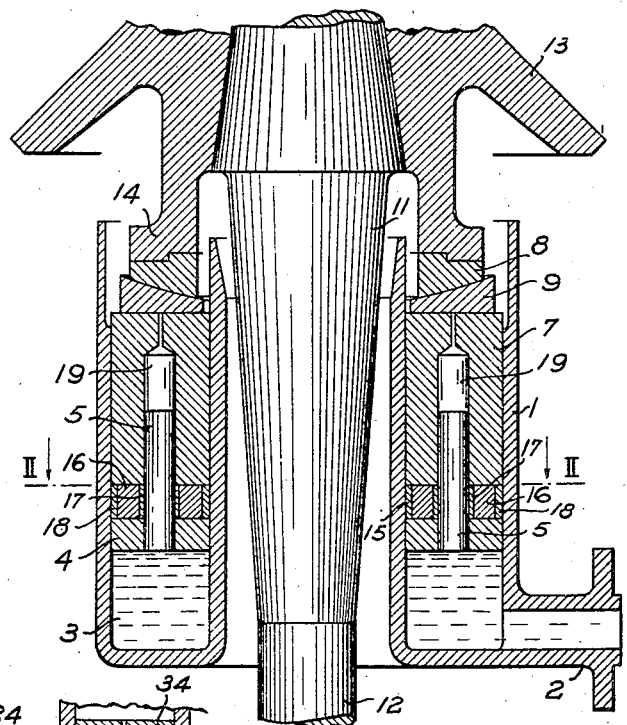
Inventor
R. C. Newhouse
by G. J. DeWein
Attorney Patented Mar. 14, 1933

1,901,766

UNITED STATES PATENT OFFICE

RAY C. NEWHOUSE, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

PACKING

Application filed July 7, 1930. Serial No. 465,805.

The invention described herein relates in general to the art of packing for sleeve pistons, or the like, and relates more specifically to an arrangement of elements, including an annular packing body having hydraulic characteristics, which forms a self-adjusting equalizing packing for effectively simultaneously sealing the opposed walls of an annular working cylinder or the like.

An object of the invention is to provide a packing whereby tight joints can be formed simultaneously against the opposed piston engaging surfaces of an annular working cylinder. Another object of the invention is to provide a packing whereby tight joints can be formed simultaneously against the opposed sleeve-gland engaging surfaces, the rod surface and the stuffing box surface surrounding the rod surface, of a stuffing box. Another object of the invention is to provide an annular packing body, having hydraulic characteristics, with means producing a unit pressure therein higher than the unit pressure acting externally on said means, a portion of said means presenting passages thus permitting pressures set up in elevated portions of the semi-rigid packing body, due to irregularities in the thickness of said body, to cause a flow of material in said body through these passages towards the mass of the body that is still unloaded, (as, for instance, from the inner portions of the packing to the outer portions thereof, or vice versa) to thereby effect a uniform high unit pressure in said body when said body is completely loaded which will result in equal sealing effects of the body on the opposed walls with which it normally engages. Other objects of the invention will be apparent from a reading of the specification and the drawing forming a part thereof.

The subject matter broadly of a packing made up of a body having hydraulic characteristics and a second body having mechanical characteristics for isolating the first and for sustaining the rubbing contact, disclosed herein is the subject of claims in U. S. patent in the name of George D. Becker, No. 1,858,815, dated May 17, 1932.

On the drawing:

Fig. 1 is a longitudinal transverse section of a head or weight supporting annular working cylinder having the improved packing associated with the annular piston thereof.

Fig. 2 is a horizontal transverse section of the showing in Fig. 1 taken along the line II—II thereof and looking in the direction of the arrows.

Fig. 3 is a fragmentary longitudinal sectional view of the annular working cylinder shown in Fig. 1 and shows a modified form of packing associated with the piston thereof.

Fig. 4 is also a fragmentary longitudinal sectional view of the annular working cylinder and shows another modified form of packing associated with the piston thereof.

Referring to Fig. 1 reference numeral 1 represents an annular cylindrical casing closed at the bottom and having a flanged fluid inlet extension 2 in the outer wall of the casing at the bottom thereof. The casing is made annular in order to axially receive a shaft 12 carrying a head 13 which is supported by the pressure in a fluid 3, which may be lubricating oil, acting on piston means in the casing. The piston 7 is in the form of a cylindrical sleeve of a suitable metal and closely fills the annular space formed in the annular cylindrical casing 1. Reference numeral 4 represents an annular compression plate the bottom of which is in contact with the fluid 3 and between it and piston 7 is located the improved annular packing 6. The compression plate is provided with a plurality of cylindrical pins 5, preferably uniformly distributed on a concentric circle substantially in the middle of the annular surface of said plate. These pins may be pressed into cylindrical openings in said plate and their outwardly extending portions are received in corresponding longitudinal bores 19, partly extending through piston 7. Between the rabbeted bearing edge of the head 13 of a grinding element 11 and the piston 7 is a pair of cooperating annular bearings 8 and 9. Although a grinding element 11 has been shown as being supported by the annular piston 7 it will be apparent, that as far as the disclosed improved packing associated with the piston 7 of the working cylinder 1 is concerned, that any kind of element may serve as the load to be supported by said piston.

The improved annular packing 6, already referred to, comprises an annular body 16 having hydraulic characteristics and a plurality of rings having high mechanical properties, namely resistant to wear due to rubbing, flexible, and normally incapable of flowing. Rings 15 and 18 cover the inner and outer cylindrical surfaces respectively, of the annular body 16 and bear against the corresponding surfaces of the casing 1. The pins surrounding rings 17 cover the cylindrical wall portions, formed in body 16 by providing same with apertures for receiving the pins 5. The lengths of the pins 5 and bores 19 are so proportioned and designed to provide spaces between the ends of the pins 5 and the ends of the bores 19 to permit of a limited telescopic movement of piston 7 and pins 5 due to the compressing of the hydraulic body 16.

The sealing action of this form of packing is accomplished as follows. With a certain unit pressure in the fluid 3 a greater value of unit pressure will exist in the incompressible body 16 depending upon the amount by which the area of the annular hydraulic body 16 has been decreased under the area of annular compression plate 4, by pins 5 provided for this purpose. If irregularities in the thickness of the hydraulic body exist causing one portion only of the annular edge of the piston to make contact with an elevated portion of said body the pressure set up in the hydraulic body by this partial contact of piston 7 and said body causes hydraulic material to flow through passages provided between the pins 5 until the whole area of the hydraulic body is pressed against or engaged by the whole bearing area of the piston 7. The unit pressure in the hydraulic body 16 will then be equal at all points thereof and consequently the pressures acting on rings 15 and 18 will be equal and therefore the sealing effect of ring 15 on the inner surface of the annular cylinder will be equal to the sealing effect of ring 18 on the outer surface of said cylinder and since this pressure is greater than the unit pressure in the fluid 3, as explained above, an effective self-adjusting equalizing packing for simultaneously sealing the opposed walls of the annular cylinder is provided and prevents the escape of fluid 3, past the piston 7.

In the modified form of packing illustrated by Fig. 3, a sleeve 21 projecting from approximately the mid portion of the base of annular compression plate 20 and integral therewith is substituted for the separate pins 5 of the modification shown in Fig. 1 and this sleeve is received in an annular longitudinal slot 24 extending partly through the piston 23. Sleeve 21 has a circular series of transverse openings 22 therein which are filled with bodies 29 which may be solid bodies free to move in said openings or bodies having hydraulic characteristics. Openings 22 are so located in the sleeve 21 that they lie approximately opposite the mid portions of inner and outer, annular bodies 25 and 27 having hydraulic characteristics and of rectangular cross-sections. Rings 26 and 28 cover the faces of the annular bodies 25 and 27 which are directed toward the inner and outer cylindrical surfaces respectively, of the annular cylindrical casing 1.

The sealing action of this form of packing is similar to that of the packing shown in Fig. 1. The unit pressure in hydraulic bodies 25 and 27 is greater than the unit pressure in the fluid 3 depending upon the amount by which the area of the hydraulic bodies has been reduced under the area of the annular compression plate 20, by sleeve 21. Should one of the annular hydraulic bodies, 25 for instance, be thicker than 27, piston 23 will first engage it. Until the hydraulic body 27 is engaged also by the piston 23, the pressures set up in body 25 will cause displacement of that body to be transmitted to the body 27 through the masses of bodies 29 in apertures 22 in sleeve 21. When the piston 23 engages both hydraulic bodies 25 and 27, equal unit pressure will exist at all points in said bodies and this unit pressure will act on rings 26 and 28 and therefore the sealing effect of ring 26 on the inner surface of the annular cylinder will be equal to the sealing effect of ring 28 on the outer surface of the annular cylinder and since this unit pressure is greater than the unit pressure in the fluid 3, as explained above, an effective self-adjusting equalizing packing for simultaneously sealing the opposed walls of the annular cylinder is also provided by this form of packing. Rings 26 and 28 possess the same mechanical properties as recited above for rings 15, 17 and 18.

In the modified form of packing shown in Fig. 4, piston 34 is provided with an annular longitudinal slot 35, extending partly therethrough to receive a sleeve 36 of approximately the same width as the slot but somewhat shorter than said slot. An annular body 31 having hydraulic characteristics is provided with an annular rectangular recess opposite the slot 35, which receives the similarly depressed portion of a casing 32 having high mechanical characteristics, as recited above and may be made of lead, and which casing completely encases the hydraulic body 31, the lower portion of sleeve 36 being received in said depressed portion.

Stud surrounding rings 33 cover the wall portions formed in body 31 by providing same with apertures for receiving the studs 37. Casing 32 may, however, be dispensed with in which case the annular recess in packing body 31 is made to closely receive the lower portion of sleeve 36, directly. Below the packing body is an annular compression plate 30 and a plurality of studs 37 having one of their ends screwed into sleeve 36 and their other end provided with nuts which engage the bottom of said compression plate are used to neutralize by tension therein the effect the high unit pressure has on the sleeve 36 and on the compression plate 30. The sealing action of this form of packing is as follows. When no displacement of the piston 34 and its associated parts occurs the pressure acting upwardly on the bottom of compression plate 30 must be equal to the pressure, due to the load supported by the piston, acting downwardly on the top of the piston. The unit pressure in the hydraulic body 31 will be higher than said pressure by an amount depending upon the area of the sleeve 36. This higher pressure will act at every point in the hydraulic body 31 and therefore the upper face of the compression plate 30 will have this higher value of pressure acting downwardly on it and the pressure in the liquid acting upwardly on its lower face requiring a definite value of force to restrain it from displacement. This higher value of pressure in the hydraulic body 31 also acts on the lower end of the sleeve 36 and requires a force, equal to the force necessary to restrain the compression plate from displacement, to restrain it from displacement. These necessary forces are provided by the studs 37 which are under tension by the amount of said forces. Since the studs 37 reduce the effective area of the top surface of compression plate 30 by the same amount that they reduce the effective area of the lower surface of sleeve 36, their size does not affect the result described which they accomplish.

The sealing action of this form of packing is as follows. If irregularities in construction and thickness of the annular hydraulic body 31 exist, which can hardly be avoided, no sealing effect takes place between the hydraulic body and the opposed cylindrical walls until the piston engages the whole of the packing surface exposed to it. Until this engagement occurs the pressures set up in the hydraulic body cause it to flow or are transmitted towards the mass of hydraulic body that is still unloaded and no impedance to such a flow of pressure is present except the inappreciable amount due to the circumferentially spaced studs 37 whose spacing provides the desired flow passages. When the piston 34 engages the entire surface of the hydraulic body 31 presented to it, the unit pressure in said body will be equal at all points thereof and consequently the pressures acting on the cylindrical portions of the hydraulic body encasing member or casing 32 will be equal and therefore the sealing effect of the inner of said cylindrical portions on the inner surface of the annular cylinder 1, will be equal to the sealing effect of the outer of said cylindrical portions on the outer surface of said cylinder and since this pressure is greater than the unit pressure in the fluid 3, as explained above, an effective self-adjusting equalizing packing for simultaneously sealing the opposed walls of the annular cylinder 1 is provided and prevents the escape of fluid past the piston 34.

The hydraulic bodies 16, 25, 27 and 31 may be of a composition, known as factis, a sulphur chloride compound of vegetable oil which has the desired hydraulic characteristics in that it is incompressible.

It should be understood that it is not desired to limit the invention to the exact details of construction and arrangement of elements herein shown and described, for various modifications within the scope of the claims may occur to persons skilled in the art.

It is claimed and desired to secure by Letters Patent:

1. In combination, an annular cylindrical casing, a sleeve piston therein, provided with a recess, a compression plate carrying means received in said recess, an annular hydraulic body between the opposed walls of said cylinder, said plate carried means cooperating with said casing and with said piston and compression plate located therein to provide, when said piston is loaded, in said hydraulic body a unit pressure differing from the unit pressure acting externally on said compression plate, said plate carried means presenting transverse channels therethrough in the plane of the hydraulic body and thus permitting the flow of the hydraulic body from points first subjected to pressure by the contact of said piston therewith, due to unavoidable differences in the thickness of said hydraulic body, to provide a self-adjusting equalizing packing for effectively simultaneously sealing the opposed walls of said cylinder.

2. In combination, an annular cylindrical casing, a sleeve piston therein, provided with a recess, a compression plate carrying means received in said recess, a hydraulic body between the opposed walls of said cylinder, said plate carried means cooperating with said casing and with said piston and compression plate located therein to provide, when said piston is loaded, in said hydraulic body a unit pressure higher than the unit pressure acting externally on said compression plate, said plate carried means presenting transverse channels therethrough in the plane of the hydraulic body and thus also permitting the flow of the hydraulic body from points first subjected to pressure by the contact of said piston therewith, due to unavoidable differences in the thickness of said hydraulic body, to provide a self-adjusting equalizing packing for simultaneously sealing the opposed walls of said cylinder.

3. In combination with an annular packing body having hydraulic characteristics, means for producing unit pressure therein higher than the unit pressure acting externally on said means, a portion of said means presenting radially directed, transverse channels and thus also permitting the initial pressure set up in the packing body to cause a flow in a radial direction of the material in said body from one portion to another portion of said body, to thereby effect a uniform high unit pressure in said body when it is completely loaded.

4. In combination with an annular working cylinder, an annular piston therein, provided with a plurality of bores, a compression plate having means that is received in said bores and an annular hydraulic body between said piston and said plate, forming a self-adjusting equalizing packing for simultaneously sealing the opposed walls of said cylinder.

5. In combination with an annular working cylinder, an annular piston therein, provided with a plurality of bores, an annular compression plate having projecting cylindrical portions in said bores and an annular hydraulic body between said piston and said plate, forming a self-adjusting equalizing packing for simultaneously sealing the opposed walls of said cylinder.

6. In combination with an annular working cylinder, an annular piston therein, provided with an annular slot, an annular compression plate having a projecting portion in said slot, said projecting portion being provided with a plurality of apertures, solid bodies in said apertures and a hydraulic body between said piston and said plate, forming a self-adjusting equalizing packing for effectively simultaneously sealing the opposed walls of said cylinder.

7. In combination with an annular working cylinder, an annular piston therein, provided with an annular slot, an annular compression plate having a projecting portion in said slot, said projecting portion being provided with a plurality of apertures, a hydraulic material in said apertures and a hydraulic body between said piston and said plate, forming a self-adjusting equalizing packing for simultaneously sealing the opposed walls of said cylinder.

8. In combination with an annular working cylinder, an annular piston therein, provided with an annular cylindrical slot, an annular compression plate having a projecting sleeve portion in said slot, said sleeve portion being provided with a plurality of transverse apertures, a hydraulic material in said apertures and a hydraulic body between said piston and said plate, said body forming together with said material, a self-adjusting equalizing packing for simultaneously sealing the opposed walls of said cylinder.

9. In combination with opposed concentric cylindrical surfaces, a sleeve engaging said surfaces and having longitudinal bores, an annular plate also engaging said surfaces and provided with members extending into said bores and a hydraulic body between said sleeve and said plate, forming a a self-adjusting equalizing packing for simultaneously sealing said opposed cylindrical surfaces.

10. In combination with opposed concentric cylindrical surfaces, a sleeve engaging said surfaces and having an annular longitudinal slot, an annular plate also engaging said surfaces and having a projecting portion in said slot, said projecting portion being provided with a plurality of apertures, a hydraulic material in said aperatures, and a hydraulic body between said sleeve and said plate, forming a self-adjusting equalizing packing for simultaneously sealing said opposed cylindrical surfaces.

In testimony whereof, the signature of the inventor is affixed hereto.

RAY C. NEWHOUSE.